2 Sheets—Sheet 1.
J. A. HOUSE.
APPARATUS FOR FORMING AND SHAPING CORSETS.
No. 10,173. Reissued Aug. 1, 1882.
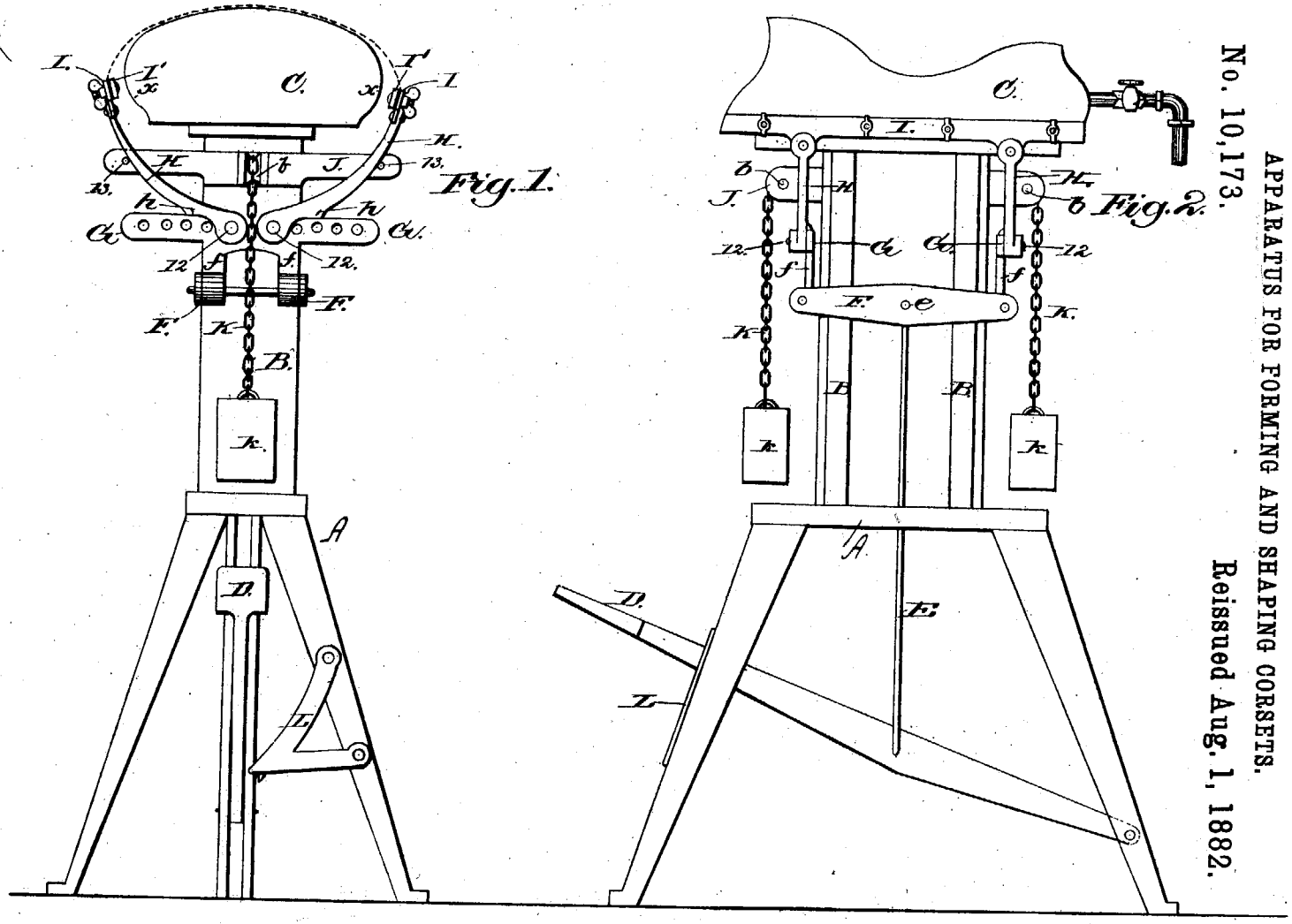
Witnesses
Bernie J. Noyes.
Fred N. Powell.
Inventor.
James A. House.
by Crosby & Gregory
Attys.
N. PETERS. Photo-Lithographer, Washington, D. C.

J. A. HOUSE.

APPARATUS FOR FORMING AND SHAPING CORSETS.

No. 10,173. Reissued Aug. 1, 1882.

Witnesses.
Bernice J. Noyes
Fred A. Pinell.

Inventor:
James A. House.
by Crosby & Gregory
attys.

N. PETERS. Photo-Lithographer. Washington. D. C.

UNITED STATES PATENT OFFICE.

JAMES ALFORD HOUSE, OF BRIDGEPORT, CONNECTICUT.

APPARATUS FOR FORMING AND SHAPING CORSETS.

SPECIFICATION forming part of Reissued Letters Patent No. 10,173, dated August 1, 1882.

Original No. 251,884, dated January 3, 1882. Application for reissue filed May 20, 1882.

*To all whom it may concern:*

Be it known that I, JAMES ALFORD HOUSE, of Bridgeport, in the county of Fairfield and State of Connecticut, have invented certain new and useful Improvements in Apparatus for Forming or Shaping Corsets, of which the following is a specification.

My invention relates to improvements in corset-formers of that class in which provision is made for giving the desired set or shape to corsets by means of forms over or upon which each corset is stretched in halves, the front and the back or the two sides of a corset being in turn shaped upon suitable forms, which are varied in size and outline as occasion may require.

My improvements consist in a novel organization of mechanism and in certain combinations of devices for clasping the edges of the corset-sections and drawing them upon the forms, as will hereinafter be designated by the claims, after first fully describing the apparatus by the aid of the accompanying drawings, in which—

Figure 3:
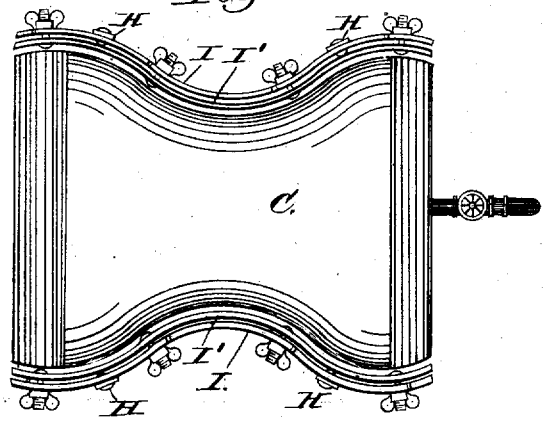
Figure 4:
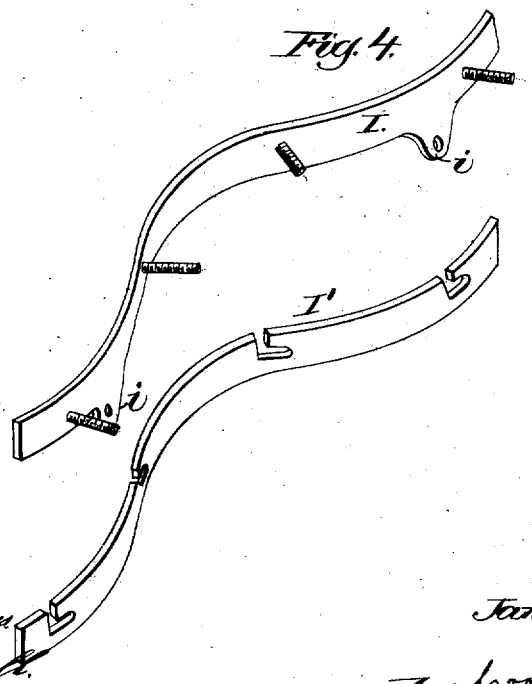

Figure 1 is a front elevation of my apparatus for shaping corsets, it representing in dotted lines one-half of a corset as having its edges engaged by the clamps preparatory to fitting the said half of the corset to and drawing it snugly about the heated form. Fig. 2 is a side elevation thereof, the corset being omitted. Fig. 3 is a plan view, representing a form and the two sets of clasps for clamping the edges of the corset-half; and Fig. 4 is a view in perspective of a pair of the clamps.

The apparatus illustrated in this instance is designed for forming corsets of the kind which are made in front and back sections, which, after being formed, are stitched together down the sides; but by obvious alterations the forms may be adapted to the forming of corsets which are made in side sections, and the corsets may be of any of the ordinary styles, open in front and provided with the usual securing devices, or opening only at the back. When made in front and back pieces the back section is laced preparatory to adjustment upon the form, and the front half, if made open, is secured at the opening preparatory to placing it upon the apparatus, which will now be described.

A suitable frame or stand, A, supports posts B, upon the upper ends of which is firmly but removably secured a form, C. Any desired number of interchangeable forms are provided to enable the different parts of corsets of varying sizes and shapes to be operated upon. The forms are by preference made hollow and connected with a steam-pipe provided with a cock, by which steam may be introduced to the form to dry and set the corset-sections after being dampened and properly stretched.

A foot-treadle, D, (a suitable hand-lever being employed, if deemed preferable,) connects by a link-rod, E, or other flexible connection with the uniting-rod or cross-bar *e* of a pair of evener-bars, F F, which are pivoted at their opposite ends to downhangers or lugs *f f*, provided in pairs upon two vertically-sliding perforated bars or carrier-frames, G G. These vertically-moving carrier-frames have oscillating clamp-holding arms H, four in number, pivoted to them. These arms H are arranged in two sets or pairs, one pair being jointed to each carrier-frame. The arms H are independently pivoted at their lower ends to the carrier-frames, as at 12, so as to vibrate vertically or move toward and from the sides X of the form, as is necessary to enable the corset to be closely fitted to the bulges of the form, as at the bust and hip. These arms may be suitably adjusted in the perforations of the frames G according to the shape of the form and size of the corset. Shoulders *h* on the arms H limit their downward movement in rocking upon their pivots. Pins 13 on the stationary arms J, acting against the rear sides of the arms H as the frames G are depressed, force the said arms and their clamps I I′ toward the form.

Two suitable sectional clamps, I I′, one for each margin or edge of a corset-half, are provided, and each of these two-part clamps is adapted by means of perforated lugs *i i* to be removably fastened near its opposite ends in an obvious way to the upper ends of the sets of holding-arms H H. The clamps I I′ may be varied in construction to adapt them to hold the corset-sections firmly, either by clamping the springs or bones thereof or by engagement with the eyelets, &c., of the corsets. These clamps are properly curved, as clearly represented in Figs. 3 and 4.

The arms J J, secured to the posts B, are provided with rollers *b b*, around which pass chains or cords K K, having weights *k k* attached to their lower ends, and connected at their upper ends, respectively, with the respective carrier-frames G G. When the treadle is freed the weights elevate the carrier-frames and their attachments.

The treadle may be held in its depressed condition by any suitable device—such, for instance, as the bracket L—beneath which the treadle may be adjusted to hold it.

In operation, the corset-section having been moistened and clamped as indicated in Fig. 1, and the treadle depressed, the corset is forced to conform to the form; and when properly stretched steam is admitted to the form to quickly dry the corset. By means of the eveners the two parts or bars of the carrier-frame are free to move independently of each other, thus enabling the ends of a corset to be made of different sizes, the only change in the apparatus being to vary the size or shape of the form.

I am aware that various devices have been provided and used prior to my invention for forming corsets, and do not therefore broadly claim apparatus for shaping corsets by stretching and heating upon forms.

I claim—

1. In an apparatus for forming and shaping corsets, a stationary form adapted to be heated, clamps, disconnected from and entirely independent of the said form to engage the edges of the corset, and means to actuate the clamps while the form remains stationary, as described, to stretch the corset about the form, as and for the purpose set forth.

2. The form adapted to be heated and curved clamps to engage the edges of the corset, combined with the independent holding-arms, arranged in pairs to support the opposite ends of the said clamps, the pivots of each pair of holding-arms at opposite ends of the clamps being made independently movable vertically toward and from the form, whereby the clamps are enabled by their unequal movement to draw the corset about and fit the same to the form, substantially as described.

3. In an apparatus for forming and shaping corsets, a form adapted to be heated and clamps to hold the edges of the corset, combined with clamp-holding arms, adapted to be moved toward and from the sides of the form, to fit the corset closely to the bulges of the form, substantially as described.

4. The combination of the sliding carrier-frames, the evener-bars pivoted to said frames, the holding-arms, the corset-clamps, and the form, substantially as and for the purpose hereinbefore set forth.

5. The combination of the vertically-sliding carrier-frames, the evener-bars independently pivoted thereto, the pivoted clamp-holding arms, the corset-clamps, the form, and means for depressing the evener-bars, substantially as and for the purpose hereinbefore set forth.

6. The combination of the clamp-holding arms, the vertically-sliding independently-adjustable carrier-frames to which said arms are pivoted, the evener-bars, the treadle, and the link connecting the evener-bars and treadle, these members being and operating, substantially as hereinbefore set forth, to form the corset of varying size at the hip and bust, as described.

JAMES ALFORD HOUSE.

Witnesses:
HENRY F. GOODWIN,
CHARLES H. DIMOND.